(12) United States Patent
Lee

(10) Patent No.: US 12,219,199 B2
(45) Date of Patent: Feb. 4, 2025

(54) IMAGE DISPLAY DEVICE AND OPERATION METHOD THEREOF

(71) Applicant: LG ELECTRONICS INC., Seoul (KR)

(72) Inventor: Inchul Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/922,317

(22) PCT Filed: Apr. 29, 2020

(86) PCT No.: PCT/KR2020/005748
§ 371 (c)(1),
(2) Date: Oct. 28, 2022

(87) PCT Pub. No.: WO2021/221213
PCT Pub. Date: Nov. 4, 2021

(65) Prior Publication Data
US 2023/0179819 A1 Jun. 8, 2023

(51) Int. Cl.
*H04N 21/41* (2011.01)
*H04H 20/53* (2008.01)
(Continued)

(52) U.S. Cl.
CPC ...... *H04N 21/41265* (2020.08); *H04H 20/53* (2013.01); *H04N 21/431* (2013.01); *H04N 21/44008* (2013.01); *H04N 21/812* (2013.01)

(58) Field of Classification Search
CPC ........... H04N 21/41265; H04N 21/431; H04N 21/44008; H04N 21/812; H04H 20/53
See application file for complete search history.

(56) References Cited

U.S. PATENT DOCUMENTS

| | | | | |
|---|---|---|---|---|
| 2005/0266834 A1* | 12/2005 | Steelberg | ............... | H04H 60/37 455/414.1 |
| 2009/0204487 A1* | 8/2009 | Cansler | .............. | G06Q 30/0251 705/14.56 |
| 2015/0326814 A1* | 11/2015 | Stephens | ............ | H04N 21/4316 725/32 |

FOREIGN PATENT DOCUMENTS

| | | |
|---|---|---|
| JP | 2009124352 | 6/2009 |
| KR | 1020090096139 | 9/2009 |

(Continued)

OTHER PUBLICATIONS

PCT International Application No. PCT/KR2020/005748, International Search Report dated Jan. 22, 2021, 3 pages.

*Primary Examiner* — Nnenna N Ekpo
(74) *Attorney, Agent, or Firm* — LEE, HONG, DEGERMAN, KANG & WAIMEY

(57) ABSTRACT

The present invention relates to an image display device and an operation method thereof. The image display device, according to one embodiment of the present invention, comprises: a display; a network interface unit for carrying out communication with an external server via a network; a broadcast receiving unit for receiving a broadcast signal; a storage unit; and a control unit. The control unit: receives a personalized advertisement signal including advertisement content via at least one among the network interface unit and the broadcast receiving unit; outputs the advertisement content through the full area of the display; receives a broadcast signal including broadcast content via at least one among the network interface unit and the broadcast receiving unit; calculates the ending time of the advertisement content; determines whether the starting time of the broadcast content is before the ending time of the advertisement content; and if the starting time of the broadcast content is before the ending time of the advertisement content, may output the (Continued)

broadcast content through a first area in the full area of the display and output the advertisement content through a second area in the full area of the display, starting from the starting time of the broadcast content. Other various embodiments are possible.

8 Claims, 9 Drawing Sheets

(51) Int. Cl.
*H04N 21/431* (2011.01)
*H04N 21/44* (2011.01)
*H04N 21/81* (2011.01)

(56) References Cited

FOREIGN PATENT DOCUMENTS

| | | |
|---|---|---|
| KR | 1020090109196 | 10/2009 |
| KR | 1020150083289 | 7/2015 |
| KR | 1020170033071 | 3/2017 |

* cited by examiner

IMAGE DISPLAY DEVICE AND OPERATION METHOD THEREOF

CROSS-REFERENCE TO RELATED APPLICATIONS

This application is the National Stage filing under 35 U.S.C. 371 of International Application No. PCT/KR2020/005748, filed on Apr. 29, 2020, the contents of which are all incorporated by reference herein in their entirety.

TECHNICAL FIELD

The present disclosure relates to an image display device and an operating method thereof.

BACKGROUND ART

An image display device is a device having a function of displaying an image that a user can watch, and a user can watch a broadcast through an image display device. For example, the image display device may include a Television (TV), a monitor, a projector, and the like having a liquid crystal display (LCD) using liquid crystal or an OLED display using an organic light emitting diode (OLED).

Recently, a digital TV service using a wired or wireless network communication network has been spread, and the digital TV service provides various services that cannot be provided by an existing analog broadcasting service. Here, the digital TV service may include not only a digital terrestrial broadcasting, but also a digital cable broadcasting, a digital satellite broadcasting, an IP-TV service, a terrestrial and satellite DMB service, a VOD service provided through a communication network, and the like.

In addition, the advertising market targeting users who use digital TV services is expanding and segmenting. In particular, when a subject providing broadcast contents and a subject transmitting a broadcast signal to an image display device are divided, for example, when a local network operator receives broadcast contents from a contents provider providing broadcast contents, and transmits a broadcast signal including broadcast contents to each image display device, a subject transmitting a broadcast signal may also provide advertisement contents targeted to viewers in a corresponding area. For example, an advertisement time for exposing advertisement contents of a local network operator may be allocated between broadcast times of broadcast contents provided by a contents provider, and the local network operator may provide advertisement contents according to a corresponding advertisement time.

Meanwhile, if the broadcast time of the broadcast contents arrives before the entire contents of the advertisement contents is output, due to an unstable state of the network communication network or a delay in signal processing of the image display device, there is a problem in that the output of the advertisement contents should be stopped and the broadcast contents should be output.

DISCLOSURE

Technical Problem

The present disclosure has been made in view of the above problems, and provides an image display device that can provide both advertisement contents and broadcast contents to viewers without stopping the output of the advertisement contents, even when the broadcast time of the broadcast contents arrives before the entire contents of the advertisement contents is output, and an operating method thereof.

Technical Solution

In an aspect, there is provided an image display device including: a display; a network interface unit configured to communicate with an external server through a network; a broadcast reception unit configured to receive a broadcast signal; a storage unit; and a controller, wherein the controller receives a personal advertisement signal including advertisement contents through at least one of the network interface unit and the broadcast reception unit, outputs the advertisement contents through an entire area of the display, receives the broadcast signal including broadcast contents through at least one of the network interface unit and the broadcast reception unit, calculates an end time of the advertisement contents, determines whether a start time of the broadcast contents precedes the end time of the advertisement contents, and when the start time of the broadcast contents precedes the end time of the advertisement contents, outputs the broadcast contents through a first area of the entire area of the display from the start time of the broadcast contents and outputs the advertisement contents through a second area of the entire area of the display.

Meanwhile, in another aspect, there is provided a method of operating an image display device, the method including: an operation of receiving a personal advertisement signal including advertisement contents, through at least one of a network interface unit for communicating with an external server through a network and a broadcast reception unit for receiving a broadcast signal, an operation of outputting the advertisement contents through an entire area of the display, an operation of receiving the broadcast signal including broadcast contents through at least one of the network interface unit and the broadcast reception unit, an operation of calculating an end time of the advertisement contents, an operation of determining whether a start time of the broadcast contents precedes the end time of the advertisement contents, and a simultaneous output operation of outputting the broadcast contents through a first area of the entire area of the display from the start time of the broadcast contents, and outputting the advertisement contents through a second area of the entire area of the display, when the start time of the broadcast contents precedes the end time of the advertisement contents.

Advantageous Effects

The effects of the image display device and the operating method thereof according to the present disclosure will be described as follows.

According to various embodiments of the present disclosure, broadcast contents and advertisement contents may be provided without time delay, by using a synchronization signal.

In addition, according to various embodiments of the present disclosure, when the broadcast time of the broadcast contents arrives before the entire contents of the advertisement contents is output, both broadcast contents and advertisement contents can be provided to viewers, by simultaneously outputting broadcast contents to a first area of a display and advertisement contents to a second area of the display, without stopping the output of advertisement contents.

Further scope of applicability of the present disclosure will become apparent from the following detailed description. However, it should be understood that the detailed description and specific embodiments such as preferred embodiments of the present disclosure are given by way of example only, since various changes and modifications within the spirit and scope of the present disclosure may be clearly understood by those skilled in the art.

MODE FOR INVENTION

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In general, suffixes such as "module" and "unit" may be used to refer to elements or components. Use of such suffixes herein is merely intended to facilitate description of the specification, and the suffixes do not have any special meaning or function.

In the present application, it should be understood that the terms "comprises, includes," "has," etc. specify the presence of features, numbers, steps, operations, elements, components, or combinations thereof described in the specification, but do not preclude the presence or addition of one or more other features, numbers, steps, operations, elements, components, or combinations thereof.

It will be understood that although the terms first, second, etc. may be used herein to describe various elements, these elements should not be limited by these terms. These terms are only used to distinguish one element from another.

Figure 1:
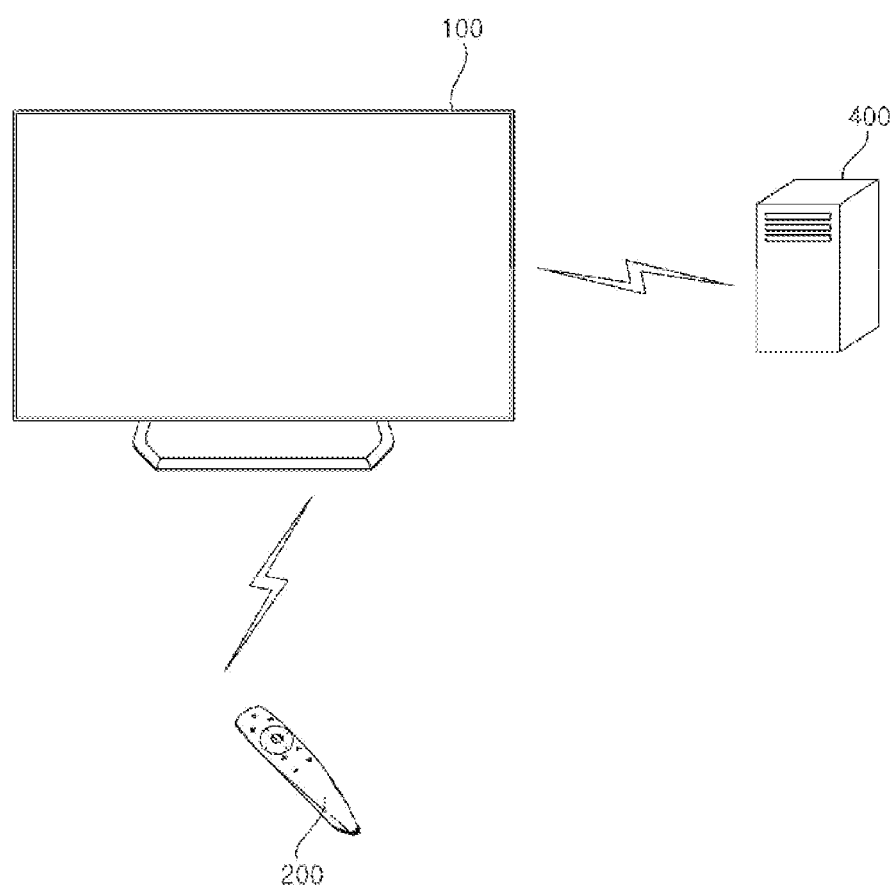
FIG. 1 is a diagram illustrating an image display system according to an embodiment of the present disclosure.

FIG. 1 is a diagram illustrating an image display system according to various embodiments of the present disclosure.

Referring to FIG. 1, an image display system 10 may include an image display device 100 and/or a remote control device 200.

The image display device 100 may be a device that processes and outputs an image. The image display device 100 is not particularly limited as long as it can output a screen corresponding to an image signal, such as a TV, a notebook computer, and a monitor.

The image display device 100 may receive a broadcast signal, process it, and output a signal-processed broadcast image. When the image display device 100 receives a broadcast signal, the image display device 100 may correspond to a broadcast reception device.

The image display device 100 may receive a broadcast signal wirelessly through an antenna, or may receive a broadcast signal by wire through a cable.

For example, the image display device 100 may receive a terrestrial broadcast signal, a satellite broadcast signal, a cable broadcast signal, an Internet Protocol Television (IPTV) broadcast signal, and the like.

The remote control device 200 may be connected to the image display device 100 by wire and/or wirelessly to provide various control signals to the image display device 100. At this time, the remote control device 200 may include a device that establishes a wired or wireless network with the image display device 100 and transmits various control signals to the image display device 100 through the established network, or receives a signal related to various operations processed by the image display device 100 from the image display device 100.

For example, various input devices such as a mouse, a keyboard, a space remote controller, a trackball, and a joystick may be used as the remote control device 200. The remote control device 200 may be referred to as an external device. Hereinafter, it is clarified in advance that an external device and a remote control device may be mixed and used as necessary.

The image display device 100 may be connected to only a single remote control device 200, or be simultaneously connected to two or more remote control devices 200, and may change the object displayed on the screen or adjust the state of the screen, based on a control signal provided from each remote control device 200.

Meanwhile, the image display system 10 may further include a server 400. The image display device 100 may transmit/receive data to and from the server 400. For example, the image display device 100 may transmit/receive data to and from the server 400 via a network such as the Internet.

The image display device 100 may transmit data related to an operation performed according to a user input to the server 400, and the server 400 may store data received from the image display device 100.

The server 400 may include a contents providing server (not shown) that transmits a broadcast signal including broadcast contents and an advertisement server (not shown) that transmits a personal advertisement signal including advertisement contents.

Here, the contents providing server and the advertisement server may be located in the same or similar area or may be located in separate areas, in some embodiment. For example, the contents providing server may be included in a first server operated by a contents provider, and the advertisement server may be included in a second server operated by a local network operator. Alternatively, for example, the contents providing server and the advertisement server may be separately implemented in one server operated by a local network operator.

The contents providing server may transmit a synchronization signal for synchronization between a broadcast signal and a personal advertisement signal. Here, the synchronization signal may include information on a start time and end time of broadcast contents.

Figure 2:
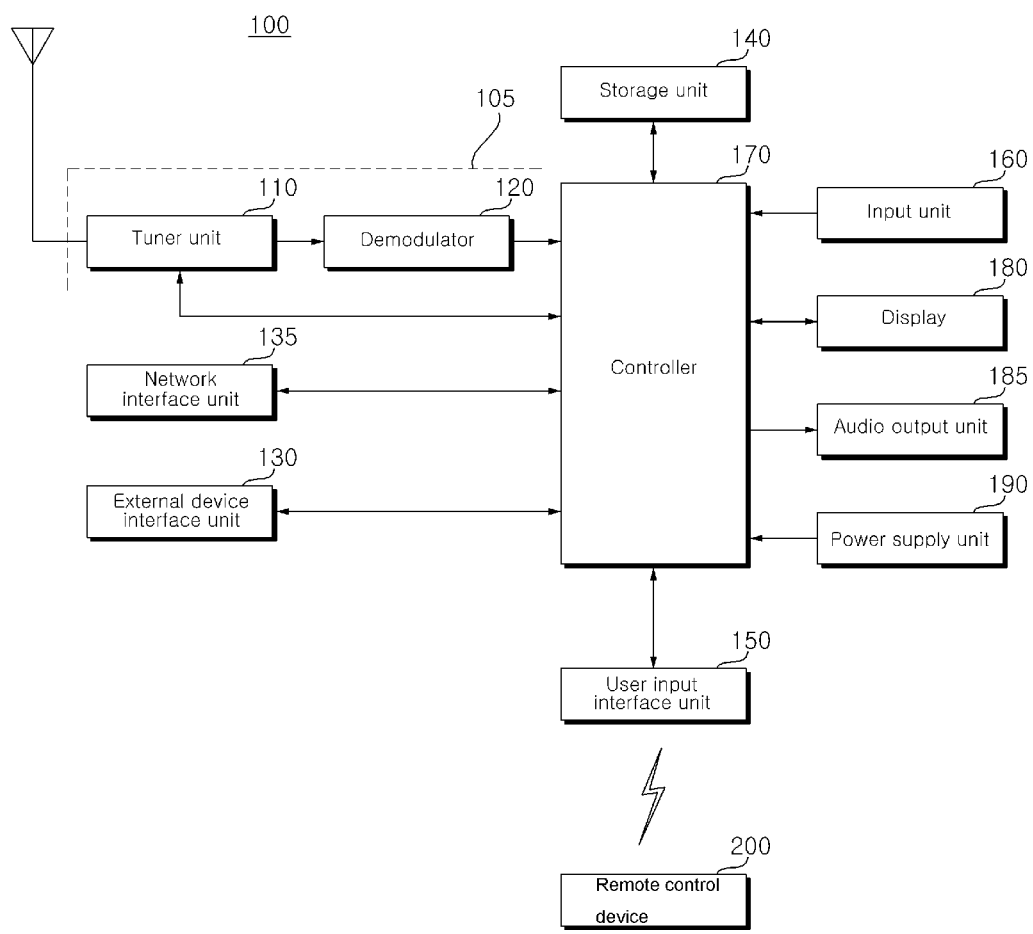
FIG. 2 is an internal block diagram of the image display device of FIG. 1.

FIG. 2 is an internal block diagram of the image display device of FIG. 1.

Referring to FIG. 2, the image display device 100 may include a broadcast reception unit 105, an external device interface unit 130, a network interface unit 135, a storage unit 140, a user input interface unit 150, an input unit 160, a controller 170, a display 180, an audio output unit 185, and/or a power supply unit 190.

The broadcast reception unit 105 may include a tuner unit 110 and a demodulator 120.

Meanwhile, unlike the drawing, the image display device 100 may include only the broadcast reception unit 105 and the external device interface unit 130, among the broadcast reception unit 105, the external device interface unit 130, and the network interface unit 135. That is, the image display device 100 may not include the network interface unit 135.

The tuner unit 110 may select a broadcast signal corresponding to a channel selected by a user or to all previously stored channels, among broadcast signals received through an antenna (not shown) or a cable (not shown). The tuner unit 110 may convert the selected broadcast signal into an intermediate frequency signal or a baseband image or voice signal.

For example, if the selected broadcast signal is a digital broadcast signal, the tuner unit 110 may convert the broadcast signal into a digital IF signal (DIF), and if the selected broadcast signal is an analog broadcast signal, may convert the broadcast signal into an analog baseband image or voice signal (CVBS/SIF). That is, the tuner unit 110 may process a digital broadcast signal or an analog broadcast signal. The analog baseband image or voice signal (CVBS/SIF) output from the tuner unit 110 may be directly input to the controller 170.

Meanwhile, the tuner unit 110 may sequentially select broadcast signals of all broadcast channels stored through a channel storage function among the received broadcast signals, and convert them into an intermediate frequency signal or a baseband image or voice signal.

Meanwhile, the tuner unit 110 may include a plurality of tuners in order to receive broadcast signals of a plurality of channels. Alternatively, a single tuner that simultaneously receives broadcast signals of a plurality of channels is also possible.

The demodulator 120 may receive a digital IF signal (DIF) converted by the tuner unit 110 and perform a demodulation operation.

The demodulator 120 may output a stream signal TS after performing a demodulation and a channel decoding. In this case, the stream signal may be a signal obtained by multiplexing an image signal, a voice signal, or a data signal.

The stream signal output from the demodulator 120 may be input to the controller 170. After performing demultiplexing and image/voice signal processing, the controller 170 may output an image through the display 180 and output a voice through the audio output unit 185.

The external device interface unit 130 may transmit or receive data with a connected external device. To this end, the external device interface unit 130 may include an A/V input/output unit (not shown).

The external device interface unit 130 may be connected to an external device such as Digital Versatile Disk (DVD), Blu-ray, game device, camera, camcorder, computer (laptop), set-top box, by wire/wireless, and may perform an input/output operation with an external device.

In addition, the external device interface unit 130 may establish a communication network with various remote control devices 200 as shown in FIG. 1, and may receive a control signal related to the operation of the image display device 100 from the remote control device 200, or may transmit data related to the operation of the image display device 100 to the remote control device 200.

The A/V input/output unit may receive image and voice signals from an external device. For example, the A/V input/output unit may include an Ethernet terminal, a USB terminal, a Composite Video Banking Sync (CVBS) terminal, a component terminal, an S-video terminal (analog), a Digital Visual Interface (DVI) terminal, a High Definition Multimedia Interface (HDMI) terminal, a Mobile High-definition Link (MHL) terminal, an RGB terminal, a D-SUB terminal, an IEEE 1394 terminal, an SPDIF terminal, a Liquid HD terminal, and the like. A digital signal input through these terminals may be transmitted to the controller 170. In this case, the analog signal input through the CVBS terminal and the S-video terminal may be converted into a digital signal through an analog-to-digital converter (not shown) and transmitted to the controller 170.

The external device interface unit 130 may include a wireless communication unit (not shown) for short-range wireless communication with other electronic device. Through such a wireless communication unit, the external device interface unit 130 may exchange data with an adjacent mobile terminal. For example, the external device interface unit 130 may receive device information, executed application information, an application image, and the like, from the mobile terminal, in a mirroring mode.

The external device interface unit 130 may perform short-range wireless communication by using Bluetooth, Radio Frequency Identification (RFID), Infrared Data Association (IrDA), Ultra-Wideband (UWB), ZigBee, or the like.

The network interface unit 135 may provide an interface for connecting the image display device 100 to a wired/wireless network including an Internet network.

The network interface unit 135 may include a communication module (not shown) for connection to a wired/wireless network. For example, the network interface unit 135 may include a communication module for a Wireless LAN (WLAN) (Wi-Fi), a Wireless broadband (Wibro), a World Interoperability for Microwave Access (Wimax), a High Speed Downlink Packet Access (HSDPA), and the like.

The network interface unit 135 may transmit or receive data with other user or other electronic device through a connected network or other network linked to the connected network.

The network interface unit 135 may receive web contents or data provided by a contents provider or a network operator. That is, the network interface unit 135 may receive web contents such as movie, advertisement, game, VOD, and broadcast signal provided from a contents provider or a network provider through a network, and information related thereto.

The network interface unit 135 may receive firmware update information and an update file provided by a network operator, and may transmit data to Internet or contents provider or network operator.

The network interface unit 135 may select and receive a desired application from among applications open to the public, through a network.

The storage unit 140 may store a program for processing and controlling each signal inside the controller 170, or may store a signal-processed image, voice, or data signal.

For example, the storage unit 140 may store application programs designed for the purpose of performing various tasks that can be processed by the controller 170, and may selectively provide some of the stored application programs, upon request of the controller 170.

The program stored in the storage unit 140 is not particularly limited as long as it can be executed by the controller 170.

The storage unit 140 may serve to temporarily store an image, audio, or data signal received from an external device through the external device interface unit 130.

The storage unit 140 may store information related to a certain broadcast channel through a channel storage function such as a channel map.

FIG. 2 illustrates an embodiment in which the storage unit 140 is provided separately from the controller 170, but the scope of the present disclosure is not limited thereto, and the storage unit 140 may be included in the controller 170.

The user input interface unit 150 may transmit a signal input by a user to the controller 170, or may transmit a signal from the controller 170 to a user.

For example, the user input interface unit 150 may transmit/receive a user input signal such as power on/off, channel selection, and screen setting from the remote control device 200, may transmit a user input signal input from a local key (not shown) such as a power key, a channel key, a volume key, and a set value to the controller 170, may transmit a user input signal input from a sensor unit (not shown) for sensing a user's gesture to the controller 170, or may transmit a signal from the controller 170 to the sensor unit.

The input unit 160 may be provided in one side of the main body of the image display device 100. For example, the input unit 160 may include a touch pad, a physical button, and the like.

The input unit 160 may receive various user commands related to the operation of the image display device 100, and may transmit a control signal corresponding to the input command to the controller 170.

The controller 170 may include at least one processor, and may control the overall operation of the image display device 100 by using the processor. Here, the processor may be a general processor such as a central processing unit (CPU). Obviously, the processor may be a dedicated device such as an ASIC or other hardware-based processor.

The controller 170 may generate and output a signal for image or voice output by de-multiplexing a stream that is input through the tuner unit 110, the demodulator 120, the external device interface unit 130, or the network interface unit 135, or processing the de-multiplexed signals.

The display 180 may convert an image signal, a data signal, an OSD signal, a control signal processed by the controller 170, or an image signal, a data signal, and a control signal received from the external device interface unit 130 to generate a driving signal.

The display 180 may include a display panel (not shown) including a plurality of pixels.

A plurality of pixels included in the display panel may include a RGB sub-pixel. Alternatively, the plurality of pixels included in the display panel may include a RGBW sub-pixel. The display 180 may generate a driving signal for a plurality of pixels by converting an image signal, a data signal, an OSD signal, a control signal, etc. processed by the controller 170.

The display 180 may be a plasma display panel (PDP), a liquid crystal display (LCD), an organic light emitting diode (OLED), a flexible display, and the like, and may be a three-dimensional (3D) display. The 3D display 180 may be divided into a non-glasses type and a glasses type.

Meanwhile, the display 180 may be configured as a touch screen and may be used as an input device in addition to an output device.

The audio output unit 185 may receive a voice-processed signal from the controller 170 and output it as voice.

The image signal processed by the controller 170 may be input to the display 180 and displayed as an image corresponding to a relevant image signal. In addition, the image signal processed by the controller 170 may be input to an external output device through the external device interface unit 130.

The voice signal processed by the controller 170 may be outputted as voice to the audio output unit 185. In addition, the voice signal processed by the controller 170 may be input to an external output device through the external device interface unit 130.

Although not shown in FIG. 2, the controller 170 may include a demultiplexer, an image processor, and the like. This will be described later with reference to FIG. 3.

In addition, the controller 170 may control overall operations in the image display device 100. For example, the controller 170 may control the tuner unit 110 to tune a channel selected by a user or a broadcast corresponding to a pre-stored channel.

In addition, the controller 170 may control the image display device 100 according to a user command input through the user input interface unit 150 or an internal program.

Meanwhile, the controller 170 may control the display 180 to display an image. In this case, the image displayed on the display 180 may be a still image or a moving image, and may be a 2D image or a 3D image.

The controller 170 may receive a personal advertisement signal including advertisement contents through at least one of the broadcast reception unit 105 and the network interface unit 135, and process the personal advertisement signal to output the advertisement contents through the display 180.

The controller 170 may receive a broadcast signal including broadcast contents through at least one of the broadcast reception unit 105 and the network interface unit 135, and may output broadcast contents through the display 180 by processing the broadcast signal. For example, the controller 170 may receive a broadcast signal through the broadcast reception unit 105, and may receive a personal advertisement signal through the network interface unit 135. Alternatively, for example, the controller 170 may receive both a broadcast signal and a personal advertisement signal through the network interface unit 135.

The controller 170 may process the personal advertisement signal to store the advertisement contents in the storage unit 140, and may output the advertisement contents stored in the storage unit 140 through the display 180. For example, while the broadcast contents is output through the display 180, the controller 170 may process the personal advertisement signal to store the advertisement contents in the storage unit 140, and may output the advertisement contents stored in the storage unit 140 simultaneously with the end of the output of the broadcast contents.

The controller 170 may process a broadcast signal to store broadcast contents in the storage unit 140, and may output the broadcast contents stored in the storage unit 140 through the display 180. For example, while the advertisement contents is output through the display 180, the controller 170 may process the broadcast signal and store the broadcast contents in the storage unit 140, and may output the broadcast contents stored in the storage unit 140 simultaneously with the end of the output of the advertisement contents.

The controller 170 may receive a synchronization signal through at least one of the broadcast reception unit 105 and the network interface unit 135, and may check a start time and an end time of the broadcast contents based on the synchronization signal. Here, the synchronization signal may be transmitted in the form of cue tone, subtitle data, or voice multicast data. Meanwhile, the synchronization signal may be transmitted by being inserted into the broadcast signal, or may be transmitted separately from the broadcast signal.

The controller 170 may determine an output available time of the advertisement contents, based on a start time and an end time of the broadcast contents. For example, the controller 170 may determine the time between the end time of a first broadcast contents and the start time of a second broadcast contents, as the output available time of the advertisement contents.

The controller 170 may calculate an end time of the advertisement contents.

The controller 170 may calculate the end time of the advertisement contents, based on the total data size of the advertisement contents, the total time, the reception delay of the broadcast signal, the processing delay of the broadcast signal, the reception delay of the personal advertisement signal, the processing delay of the personal advertisement signal, etc.

For example, when the total time of the advertisement contents is 5 minutes, in a state where the time from 10:00 to 10:05 is determined as an output available time of the advertisement contents, the end time of the advertisement contents may be calculated as 10:05, and broadcast contents may be output from 10:05. At this time, as the reception of personal advertisement signals is delayed due to the instability of the network communication network, or as processing of personal advertisement signals is delayed, when the buffering time is 10 seconds, the end time of the advertisement contents may be calculated as 10:05:10.

The controller 170 may determine whether the start time of the broadcast contents precedes the end time of the advertisement contents, and when the start time of the broadcast contents precedes the end time of the advertisement contents, the advertisement contents and the broadcast contents may be output simultaneously through the display 180. For example, the controller 170 may output broadcast contents through a first area of the entire area of the display 180, and may output advertisement contents through a second area of the entire area.

When the advertisement contents and the broadcast contents are simultaneously output through the display 180, the controller 170 may display the end time of the advertisement contents through the display together. In this case, the controller 170 may display the remaining time from the current time to the end time of the advertisement contents while changing the remaining time in real time.

The controller 170 may output any one of the broadcast contents and the advertisement contents through the entire area of the display 180, and may output the other one of the broadcast contents and the advertisement contents to overlap in a partial area of the entire area. In this case, the advertisement contents and the broadcast contents may be displayed on the same screen layer or on a different layer. For example, the controller 170 may display broadcast contents on a first layer corresponding to the entire area of the display 180, and may display the advertisement content on a second layer in the form of a pop-up having a smaller size than the entire area of the display 180.

The controller 170 may divide the entire area of the display 180 to output broadcast contents through a first divided area among the entire area, and may output advertisement contents through a second divided area among the entire area. When the output of the advertisement contents is terminated at the end time of the advertisement contents, the controller 170 may output the broadcast contents through the entire area of the display 180.

Meanwhile, the controller 170 may enable to display a certain 2D object, in the image displayed on the display 180. For example, the object may be at least one of an accessed web screen (newspaper, magazine, etc.), an electronic program guide (EPG), various menus, widget, icon, still image, moving image, and text.

Meanwhile, the image display device 100 may further include a photographing unit (not shown). The photographing unit may photograph a user. The photographing unit may be implemented with one camera, but is not limited thereto, and may be implemented with a plurality of cameras. Meanwhile, the photographing unit may be embedded in the image display device 100 in an upper portion of the display 180 or disposed separately. Image information photographed by the photographing unit may be input to the controller 170.

The controller 170 may recognize the location of a user, based on the image photographed by the photographing unit. For example, the controller 170 may determine a distance (z-axis coordinate) between a user and the image display device 100. In addition, the controller 170 may determine the x-axis coordinates and the y-axis coordinates in the display 180 corresponding to the user's location.

The controller 170 may detect a user's gesture based on each or a combination of an image photographed by the photographing unit or a signal detected from the sensor unit.

The power supply unit 190 may supply a corresponding power throughout the image display device 100. In particular, it may supply power to the controller 170 that can be implemented in the form of a system on chip (SOC), the display 180 for displaying an image, and the audio output unit 185 for outputting audio.

Specifically, the power supply unit 190 may include a converter (not shown) that converts AC power into DC power, and a DC/DC converter (not shown) that converts the level of DC power.

The remote control device 200 may transmit a user input to the user input interface unit 150. To this end, the remote control device 200 may use Bluetooth, Radio Frequency (RF) communication, Infrared Radiation communication, Ultra-wideband (UWB), ZigBee method, etc. In addition, the remote control device 200 may receive an image, voice, or data signal output from the user input interface unit 150, and display it by the remote control device 200 or output it as voice.

Meanwhile, the above-described image display device 100 may be a digital broadcasting receiver capable of receiving a fixed or mobile digital broadcasting.

Meanwhile, the block diagram of the image display device 100 shown in FIG. 2 is just only a block diagram for an embodiment of the present disclosure, and each component of the block diagram may be integrated, added, or omitted according to the specification of the image display device 100 that is actually implemented.

That is, two or more components may be combined into one component, or one component may be subdivided into two or more components as needed. In addition, the function performed in each block is for explaining the embodiment of the present disclosure, and the specific operation or device does not limit the scope of the present disclosure.

Figure 3:
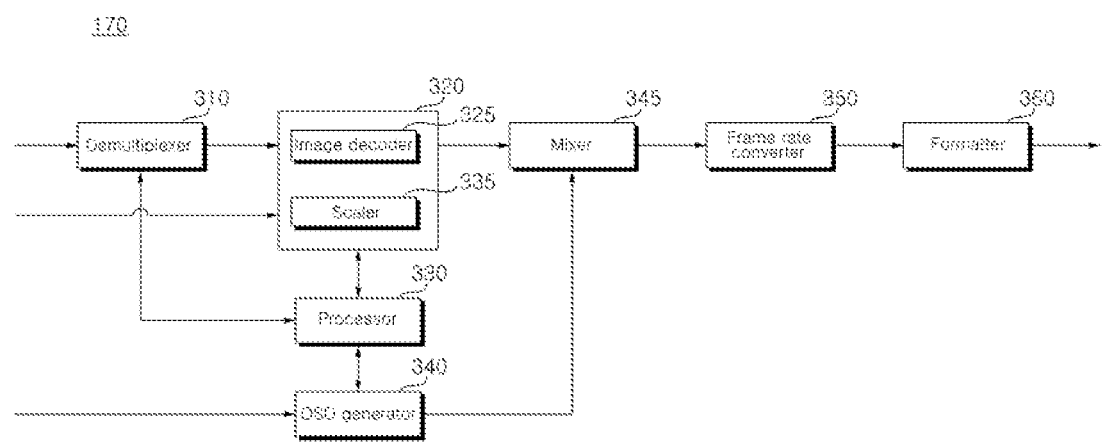
FIG. 3 is an internal block diagram of a controller of FIG. 2.

FIG. 3 is an internal block diagram of the controller of FIG. 2.

Referring to FIG. 3, the controller 170 according to an embodiment of the present disclosure may include a demultiplexer 310, an image processor 320, a processor 330, an OSD generator 340, a mixer 345, a frame rate converter 350, and/or a formatter 360. In addition, it may further include an audio processing unit (not shown) and a data processing unit (not shown).

The demultiplexer 310 may demultiplex an input stream. For example, when MPEG-2 TS is input, it can be demultiplexed and separated into image, voice, and data signals, respectively. Here, the stream signal input to the demultiplexer 310 may be a stream signal output from the tuner unit 110, the demodulator 120, or the external device interface unit 130.

The image processing unit 320 may perform image processing of the demultiplexed image signal. To this end, the image processing unit 320 may include an image decoder 325 and a scaler 335.

The image decoder 325 may decode the demultiplexed image signal, and the scaler 335 may perform scaling to output the resolution of the decoded image signal on the display 180.

The image decoder 325 may include a decoder of various standards. For example, it may include an MPEG-2, H, 264 decoder, a 3D image decoder for a color image and a depth image, a decoder for a multi-view image, and the like.

The processor 330 may control overall operation in the image display device 100 or the controller 170. For example, the processor 330 may control the tuner unit 110 to tune a channel selected by a user or a broadcast corresponding to a pre-stored channel.

In addition, the processor 330 may control the image display device 100 according to a user command input through the user input interface unit 150 or an internal program.

In addition, the processor 330 may perform data transmission control with the network interface unit 135 or the external device interface unit 130.

In addition, the processor 330 may control operations of the demultiplexer 310, the image processor 320, the OSD generator 340, and the like in the controller 170.

The OSD generator 340 may generate an OSD signal according to a user input or by itself. For example, it may generate a signal for displaying various types of information as graphic or text on a screen of the display 180, based on a user input signal input through the input unit 160.

The generated OSD signal may include various data such as a user interface screen, various menu screens, a widget, and an icon of the image display device 100. In addition, the generated OSD signal may include a 2D object or a 3D object.

In addition, the OSD generator 340 may generate a pointer that can be displayed on the display 180, based on a pointing signal input from the remote control device 200.

The OSD generator 340 may include a pointing signal processor (not shown) that generates a pointer. A pointing signal processing unit (not shown) may be provided separately instead of being provided in an OSD generating unit 240.

The mixer 345 may mix the OSD signal generated by the OSD generator 340 and the decoded image signal image-processed by the image processor 320. The mixed image signal may be provided to the frame rate converter 350.

The frame rate converter (FRC) 350 may convert a frame rate of an input image. Meanwhile, the frame rate converter 350 may output intactly without a separate frame rate conversion.

The formatter 360 may arrange a left-eye image frame and a right-eye image frame of the frame rate-converted 3D image. In addition, it may output a synchronization signal Vsync for opening the left eye glass and the right eye glass of a 3D viewing device (not shown).

Meanwhile, the formatter 360 may change the format of the input image signal into an image signal to be displayed on the display 180, and output it.

In addition, the formatter 360 may change the format of the 3D image signal. For example, it may change into any one format among various 3D formats such as a Side by Side format, a Top/Down format, a Frame Sequential format, an Interlaced format, a Checker Box format.

Meanwhile, the formatter 360 may convert a 2D image signal into a 3D image signal. For example, according to the 3D image generation algorithm, an edge or a selectable object is detected in the 2D image signal, and an object according to the detected edge or a selectable object may be separated into a 3D image signal to generate. In this case, as described above, the generated 3D image signal may be separated into a left-eye image signal L and a right-eye image signal R and arranged.

Meanwhile, although not shown in the drawing, a 3D processor (not shown) for processing a 3-dimensional effect signal may be further disposed, after the formatter 360. Such a 3D processor may process the brightness, tint, and color adjustments of an image signal in order to improve a 3D effect. For example, a signal processing that makes a near field clear and a far distance blurry may be performed. Meanwhile, the function of the 3D processor may be merged into the formatter 360 or integrated into the image processing unit 320.

Meanwhile, an audio processing unit (not shown) in the controller 170 may perform audio processing of the demultiplexed voice signal. To this end, the audio processing unit (not shown) may include various decoders.

In addition, the audio processing unit (not shown) in the controller 170 may process a base, a treble, volume control, and the like.

A data processing unit (not shown) in the controller 170 may perform data processing of the demultiplexed data signal. For example, when the demultiplexed data signal is an encoded data signal, it can be decoded. The encoded data signal may be electronic program guide information including broadcast information such as start time and end time of a broadcast program aired on each channel.

Meanwhile, the block diagram of the controller 170 shown in FIG. 3 is just only a block diagram for an embodiment of the present disclosure, and each component of the block diagram may be integrated, added, or omitted according to the specification of the controller 170 that is actually implemented.

In particular, the frame rate converter 350 and the formatter 360 may not be provided in the controller 170, but may be separately provided respectively, or provided separately as one module.

Figure 4:
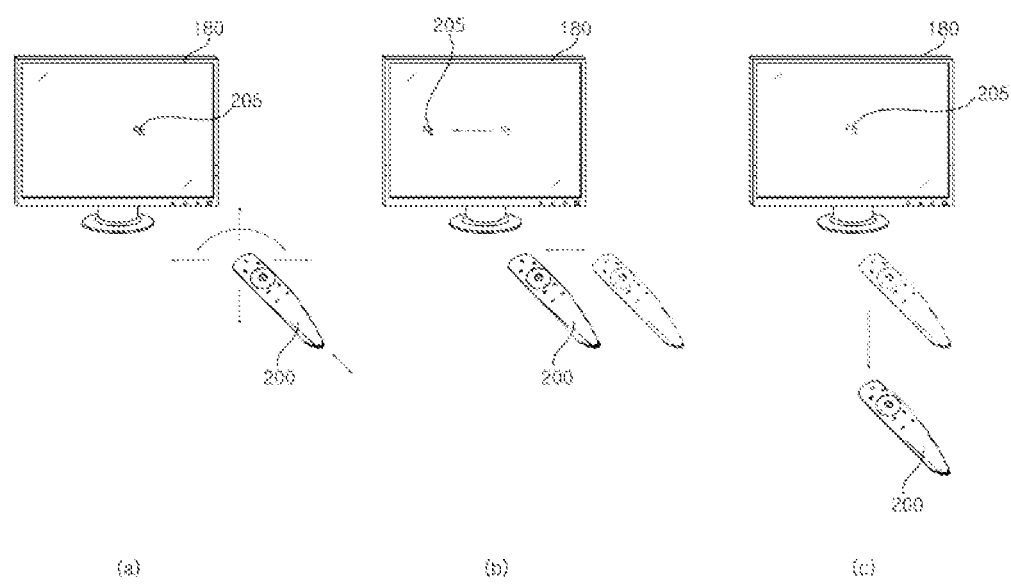
FIG. 4 is a diagram illustrating a control method of a remote control device of FIG. 2.

FIG. 4 is a diagram illustrating a control method of the remote control device of FIG. 2.

Referring to FIG. 4, it can be seen that the pointer 205 corresponding to the remote control device 200 is displayed on the display 180 of the image display device 100.

Referring to FIG. 4A, a user may move or rotate the remote control device 200 up, down, left and right, back and forth. In this case, the pointer 205 displayed on the display 180 of the image display device 100 may be displayed in response to the movement of the remote control device 200. As shown in FIG. 4A, the remote control device 200 may be called a space remote controller or a 3D pointing device, because a corresponding pointer 205 is moved and displayed according to movement in 3D space.

Referring to FIG. 4B, when a user moves the remote control device 200 to the left, it can be seen that the pointer 205 displayed on the display 180 of the image display device 100 also moves to the left in response to the movement of the remote control device 200.

Information related to the movement of the remote control device 200 detected through a sensor of the remote control device 200 may be transmitted to the image display device 100. The image display device 100 may calculate the coordinates of the pointer 205 from the information related to the movement of the remote control device 200. The image display device 100 may display the pointer 205 to correspond to the calculated coordinates.

Referring to FIG. 4C, in a state of pressing a specific button provided on the remote control device 200, a user may move the remote control device 200 away from the display 180. Accordingly, a selection area in the display 180 corresponding to the pointer 205 may be zoomed-in and displayed in an enlarged manner. On the contrary, when a user moves the remote control device 200 closer to the display 180 in a state of pressing a specific button provided in the remote control device 200, the display 180 corresponding to the pointer 205, a selection area in the display 180 corresponding to the pointer 205 may be zoomed-out and displayed in a reduced manner.

Meanwhile, when the remote control device 200 moves away from the display 180, the selection area may be zoomed-out, and when the remote control device 200 approaches the display 180, the selection area may be zoomed-in.

Meanwhile, in a state in which a user presses a specific button in the remote control device 200, recognition of vertical and horizontal movements may be excluded. That is, when the remote control device 200 moves away from or close to the display 180, the up, down, left, and right movements are not recognized, but only forward and backward movements may be recognized. In a state in which a user does not press a specific button in the remote control device 200, only up, down, left, and right movements of the remote control device 200 can be recognized, and accordingly, only the pointer 205 can be moved.

Meanwhile, the moving speed or moving direction of the pointer 205 may correspond to the moving speed or moving direction of the remote control device 200.

Figure 5:
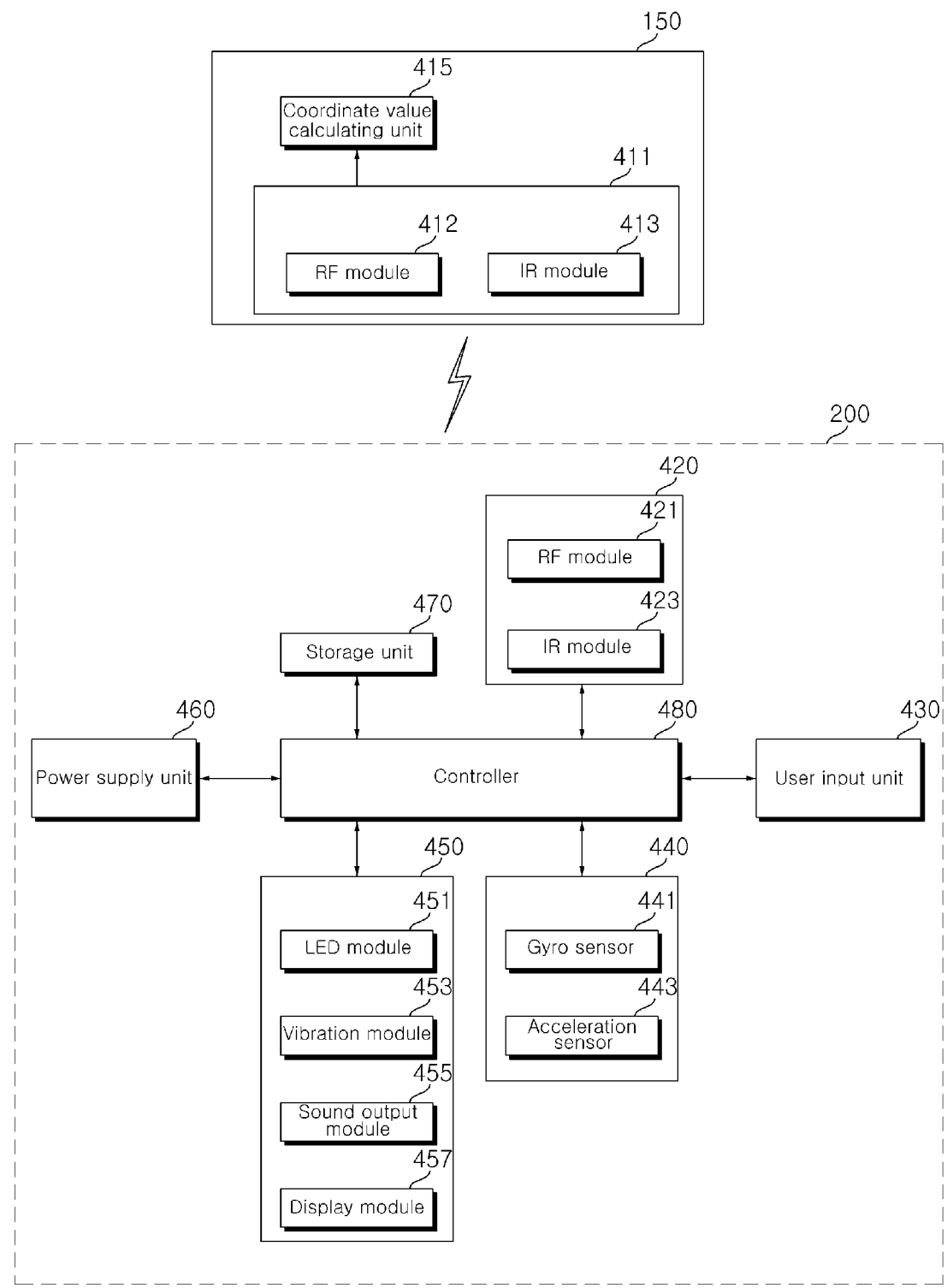
FIG. 5 is an internal block diagram of the remote control device of FIG. 2.

FIG. 5 is an internal block diagram of the remote control device of FIG. 2.

Referring to FIG. 5, the remote control device 200 may include a wireless communication unit 425, a user input unit 435, a sensor unit 440, an output unit 450, a power supply unit 460, a storage unit 470, and/or a controller 480.

The wireless communication unit 425 may transmit and receive signals to and from the image display device 100.

In this embodiment, the remote control device 200 may include an RF module 421 capable of transmitting and receiving a signal to and from the image display device 100 according to a Radio frequency (RF) communication standard. In addition, the remote control device 200 may include an IR module 423 capable of transmitting and receiving a signal to and from the image display device 100 according to an Infrared radiation (IR) communication standard.

The remote control device 200 may transmit a signal including information related to the movement of the remote control device 200 to the image display device 100 through the RF module 421. The remote control device 200 may receive a signal transmitted by the image display device 100 through the RF module 421.

The remote control device 200 may transmit a command related to power on/off, channel change, volume change, etc. to the image display device 100 through the IR module 423.

The user input unit 435 may include a keypad, a button, a touch pad, a touch screen, and the like. A user may input a command related to the image display device 100 to the remote control device 200 by handling the user input unit 435.

When the user input unit 435 includes a hard key button, a user may input a command related to the image display device 100 to the remote control device 200 through a push operation of the hard key button.

When the user input unit 435 includes a touch screen, a user may input a command related to the image display device 100 to the remote control device 200 by touching a soft key of the touch screen.

Meanwhile, the user input unit 435 may include various types of input means that a user can operate, such as a scroll key or a jog key, and the present embodiment does not limit the scope of the present disclosure.

The sensor unit 440 may include a gyro sensor 441 or an acceleration sensor 443. The gyro sensor 441 may sense a motion of the remote control device 200.

The gyro sensor 441 may sense information related to the operation of the remote control device 200 based on the x, y, and z axes. The acceleration sensor 443 may sense information related to the moving speed of the remote control device 200. Meanwhile, the sensor unit 440 may further include a distance measuring sensor capable of sensing a distance to the display 180.

The output unit 450 may output an image or voice signal corresponding to a handling of the user input unit 435 or a signal transmitted from the image display device 100. Through the output unit 450, a user may recognize the handling of the user input unit 435 or the controlling of the image display device 100.

The output unit 450 may include a LED module 451 that is turned on when the user input unit 435 is handled or a signal is transmitted and received with the image display device 100 through the wireless communication unit 425, a vibration module 453 that generates a vibration, a sound output module 455 that outputs a sound, and/or a display module 457 that outputs an image.

The power supply unit 460 may supply power to each component provided in the remote control device 200. The power supply unit 460 stops the supply of power when the remote control device 200 does not move for a certain time, thereby reducing power wastage. The power supply unit 460 may resume the supply of power when a certain key provided in the remote control device 200 is operated.

The storage unit 470 may store various types of programs and application data required for control or operation of the remote control device 200.

When the remote control device 200 wirelessly transmits/receives a signal through the image display device 100 and the RF module 421, the remote control device 200 and the image display device 100 may transmit/receive signals through a certain frequency band. The controller 480 of the remote control device 200 may store information related to a frequency band for wirelessly transmitting and receiving signals to and from the image display device 100 paired with the remote control device 200 in the storage unit 470, and refer to the stored information.

The controller 480 may include at least one processor, and may control overall operations of the remote control device 200 by using the processor included therein.

The controller 480 may transmit a signal corresponding to a certain key operation of the user input unit 435 or a signal corresponding to the movement of the remote control device 200 sensed by the sensor unit 440 to the image display device 100 through the wireless communication unit 425.

The user input interface unit 150 of the image display device 100 may include a wireless communication unit 151 capable of wirelessly transmitting and receiving signals with the remote control device 200, and a coordinate value calculating unit 415 capable of calculating a coordinate value of a pointer corresponding to an operation of the remote control device 200.

The user input interface unit 150 may wirelessly transmit/receive a signal to and from the remote control device 200 through a RF module 412. In addition, it may receive a signal transmitted by the remote control device 200 according to the IR communication standard through the IR module 413.

The coordinate value calculating unit 415 may calculate a coordinate value (x, y) of the pointer 205 to be displayed on the display 170 by correcting the hand shake or error, from a signal corresponding to the operation of the remote control device 200 received through the wireless communication unit 151.

The transmission signal of remote control device 200 input to the image display device 100 through the user input interface unit 150 may be transmitted to the controller 180 of the image display device 100. The controller 180 of the image display device 100 may determine information related to the operation and key handling of the remote control device 200 from the signal transmitted from the remote control device 200, and in response, may control the image display device 100.

As another example, the remote control device 200 may calculate a pointer coordinate value corresponding to the operation and output it to the user input interface unit 150 of the image display device 100. In this case, the user input interface 150 of the image display device 100 may transmit information related to the received pointer coordinate value to the controller 180 without a separate hand shake or error correction process.

In addition, as another example, unlike the drawing, the coordinate value calculating unit 415 may be provided inside the controller 170 instead of the user input interface unit 150.

Figure 6:
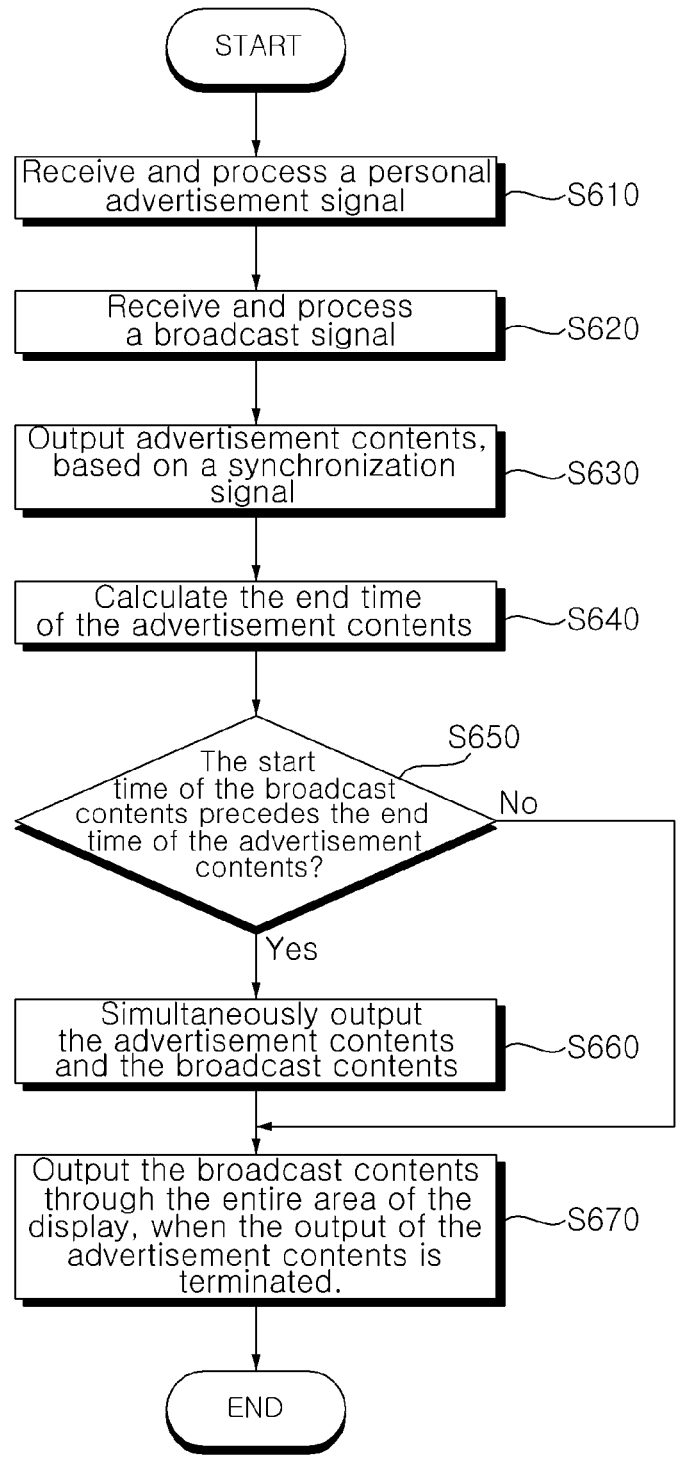
FIG. 6 is a flowchart of an operation method of the image display device according to an embodiment of the present disclosure.
Figure 7A:
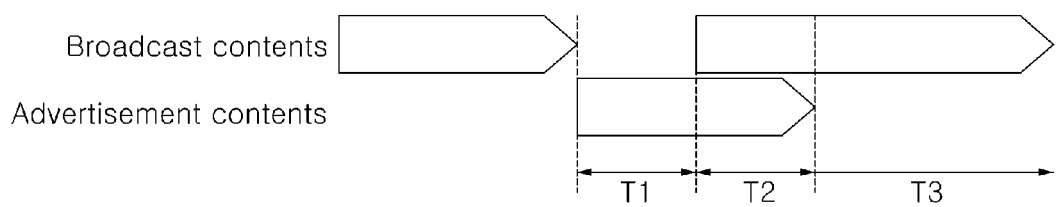
FIG. 7A to FIG. 8 are diagrams for explaining the operation method of the image display device.
Figure 7B:
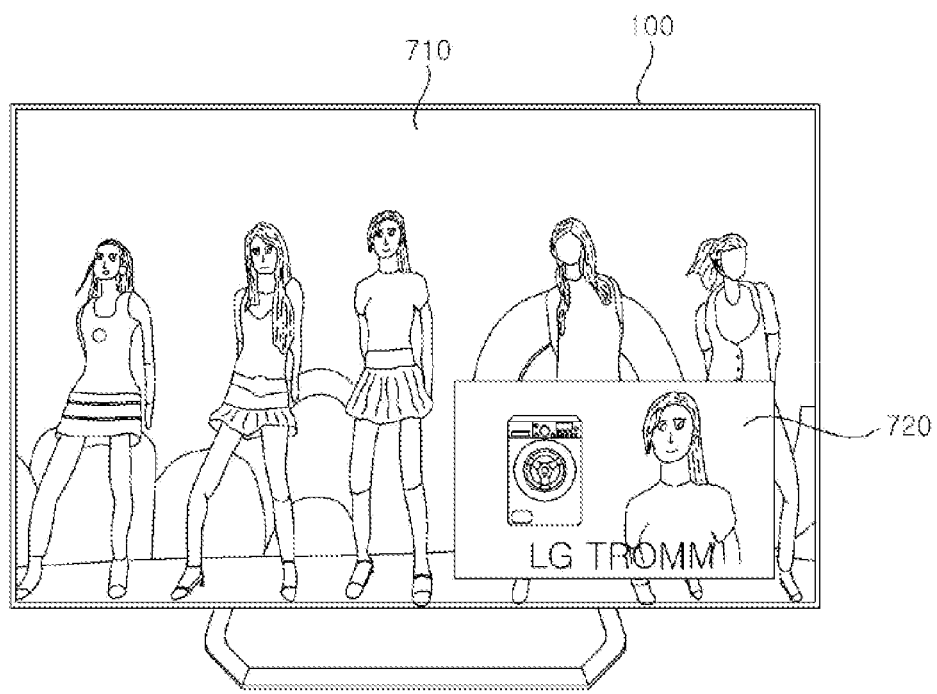
Figure 7C:
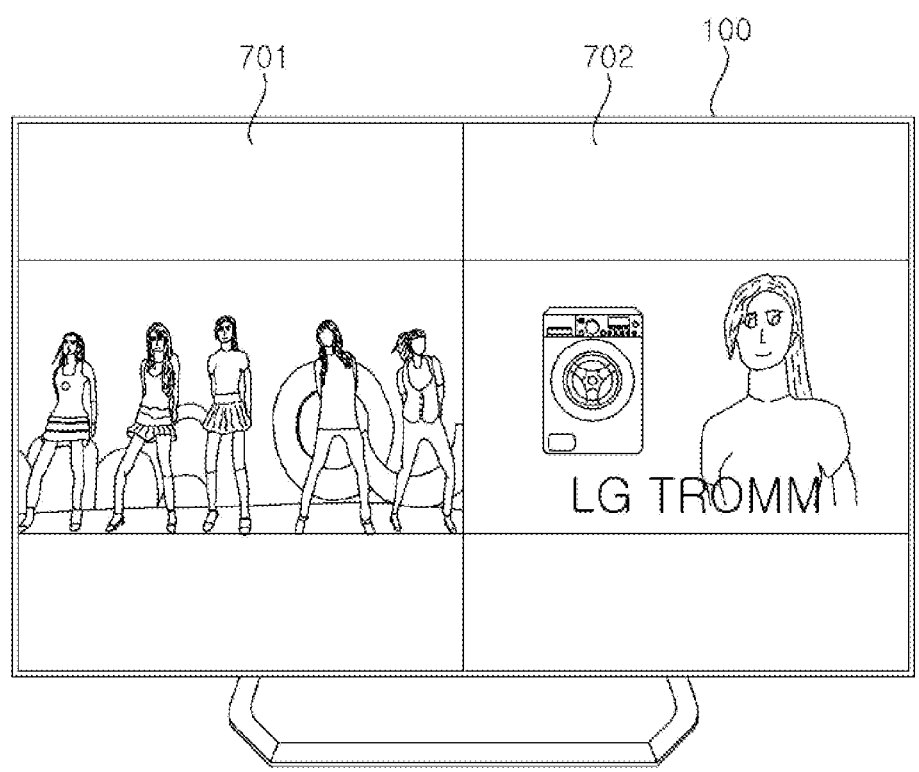
Figure 8:
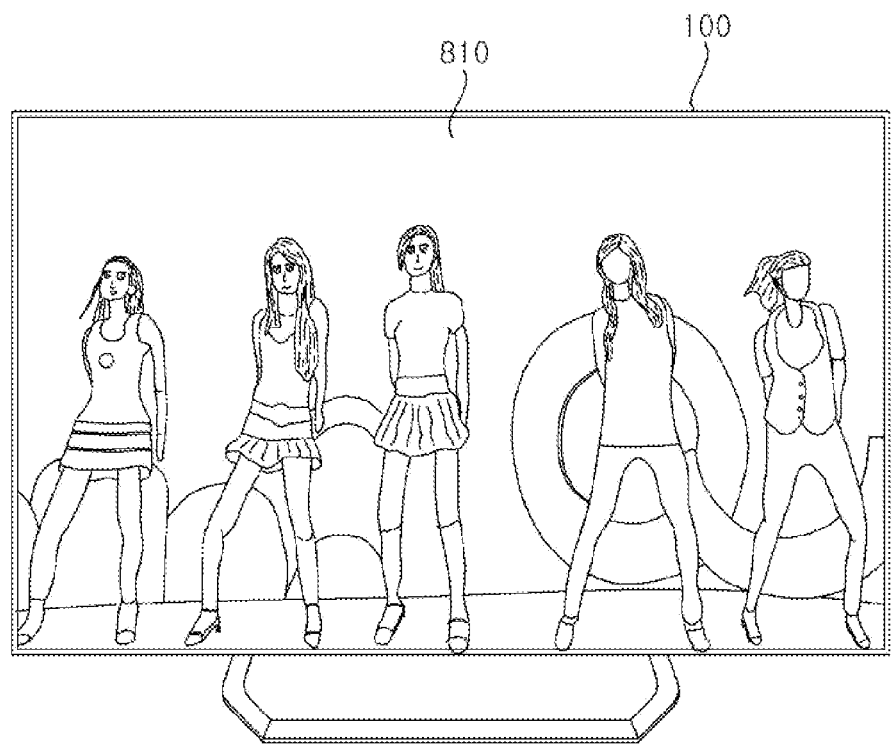

FIG. 6 is a flowchart of an operation method of an image display device according to an embodiment of the present disclosure, and FIGS. 7A to 8 are diagrams for explaining the operation method of the image display device.

Referring to FIG. 6, at operation S610, the image display device 100 may receive a personal advertisement signal including advertisement contents and process the received personal advertisement signal. For example, the image display device 100 may receive and process a personal advertisement signal from an advertisement server, and store advertisement contents in the storage unit 140.

At operation S620, the image display device 100 may receive a broadcast signal including broadcast contents, and process the received broadcast signal. For example, the image display device 100 may receive and process a broadcast signal from a contents providing server, and store the broadcast contents in the storage unit 140.

The image display device 100 may output advertisement contents, based on a synchronization signal, at operation S630. In this case, the synchronization signal may be transmitted by being inserted into the broadcast signal, or may be transmitted separately from the broadcast signal.

For example, the image display device 100 may check the start time and end time of the broadcast contents based on the synchronization signal, and may output the advertisement contents at the end time of the broadcast contents.

The image display device 100 may calculate the end time of the advertisement contents, at operation S640. For example, the image display device 100 may calculate the end time of the advertisement contents, based on at least one of a total data size of advertisement contents, a total time, the reception delay of a broadcast signal, the processing delay of a broadcast signal, the reception delay of a personal advertisement signal, and the processing delay of a personal advertisement signal.

At operation S650, the image display device 100 may determine whether the start time of the broadcast contents precedes the end time of the advertisement contents. For example, if the end time of the advertisement contents is calculated as 10:05:10 and the start time of the broadcast contents is 10:05, it can be checked that the start time of the broadcast contents is 10 seconds ahead of the end time of the advertisement contents.

In operation S660, when the start time of the broadcast contents precedes the end time of the advertisement contents, the image display device 100 may simultaneously output the advertisement contents and the broadcast contents. In this case, the image display device 100 may also display information related to the end time of the advertisement contents through the display. For example, the image display device 100 may display the remaining time from the current time to the end time of the advertisement contents while changing the remaining time in real time.

At operation S670, the image display device 100 may output the broadcast contents through the entire area of the display 180, when the output of the advertisement contents is terminated. The display and output of broadcast contents and advertisement contents of the image display device 100 will be described in more detail with reference to FIGS. 7A to 8.

Referring to FIG. 7A, a timeline related to the output of broadcast contents and a timeline related to the output of advertisement contents may be checked. Based on two timelines, the advertisement contents may be output through the entire area of the display 180 during a time T1 from the end time of the broadcast contents.

In addition, since the start time of the broadcast contents precedes the end time of the advertisement contents, the advertisement contents and the broadcast contents can be simultaneously output through the display 180 during a time T2 from the start time of the broadcast contents to the end time of the advertisement contents.

In addition, during a time T3 after the time when the output of the advertisement contents is terminated, the broadcast contents may be output through the entire area of the display 180.

Referring to FIG. 7B, the image display device 100 may output broadcast contents to a first layer 710 corresponding to the entire area of the display 180, during a time T2 from the start time of the broadcast contents to the end time of the advertising contents, and may display the advertisement contents on a second layer 720 in the form of a pop-up having a size smaller than the entire area of the display 180.

Alternatively, referring to FIG. 7C, the image display device 100 may divide the entire area of the display 180, during a time T2 from the start time of the broadcast contents to the end time of the advertising contents, output the broadcast contents through a first divided area 701 of the entire area, and output the advertisement contents through a second divided area 702 of the entire area.

Referring to FIG. 8, in the image display device 100, when the output of the advertisement contents is terminated at the end time of the advertisement contents, during a time T3 after the time when the output of the advertisement contents is terminated, the display may output only broadcast contents through an entire area 810.

As described above, according to various embodiments of the present disclosure, broadcast contents and advertisement contents can be provided to a user without time delay, by using a synchronization signal transmitted from a contents providing server.

Further, according to various embodiments of the present disclosure, when the broadcast time of the broadcast contents arrives before the entire contents of the advertisement contents is output, that is, when the start time of the broadcast contents precedes the end time of the advertisement contents, both broadcast contents and advertisement contents may be provided to viewers, by simultaneously outputting broadcast contents to the first area of the display 180 and advertisement contents to the second area of the display, without stopping the output of advertising contents.

The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

Meanwhile, the method of operating an image display device of the present disclosure can be implemented as processor-readable codes on a processor-readable recording medium provided in the image display device. The processor-readable recording medium includes all kinds of recording apparatuses storing data that can be read by a processor. Examples of the processor-readable recording medium is ROM, RAM, CD-ROM, magnetic tapes, floppy disks, optical data storage apparatuses, and, including those that are implemented in the form of carrier waves such as data transmission through the Internet. In addition, the processor-readable recording medium is dispersed in computer systems connected through a network, so that the processor-readable code can be stored and executed in a distributed fashion.

In addition, although the present disclosure has been described with reference to specific embodiments shown in the drawings, it is apparent to those skilled in the art that the present description is not limited to those exemplary embodiments and is embodied in many forms without departing from the scope of the present disclosure, which is described in the following claims. These modifications should not be individually understood from the technical spirit or scope of the present disclosure.

The invention claimed is:

1. An image display device comprising:
a display;
a network interface device configured to communicate with an external server through a network;
a broadcast reception device configured to receive a broadcast signal;
a storage device; and
a controller,
wherein the controller receives a personal advertisement signal including advertisement contents through at least one of the network interface device and the broadcast reception device, outputs the advertisement contents through an entire area of the display,
receives the broadcast signal including broadcast contents through at least one of the network interface device and the broadcast reception device,
calculates a buffering time corresponding to a time delay based on at least one of a reception delay of the broadcast signal, a processing delay of the broadcast signal, a reception delay of the personal advertisement signal or a processing delay of the personal advertisement signal,
calculates an end time of the advertisement contents by adding the buffering time and a total time of the advertisement contents to a start time of the advertisement contents,
determines whether a start time of the broadcast contents precedes the end time of the advertisement contents, and
when the start time of the broadcast contents precedes the end time of the advertisement contents, outputs the broadcast contents through a first area of the entire area of the display from the start time of the broadcast contents and outputs the advertisement contents through a second area of the entire area of the display.

2. The image display device of claim 1, wherein when the output of the advertisement contents is terminated at the end time of the advertisement contents, the controller outputs the broadcast contents through the entire area of the display.

3. The image display device of claim 2, wherein the controller receives a synchronization signal including information related to the start time and an end time of the broadcast contents, through at least one of the network interface device and the broadcast reception device, and
determines whether the start time of the broadcast contents precedes a start time of the advertisement contents and the end time of the advertisement contents, based on the synchronization signal.

4. The image display device of claim 1, wherein the controller outputs information related to a time remaining until the end time of the advertisement contents through the display, from the start time of the broadcast contents to the end time of the advertisement contents.

5. A method of operating an image display device, the method comprising:
an operation of receiving a personal advertisement signal including advertisement contents, through at least one of a network interface device for communicating with an external server through a network and a broadcast reception device for receiving a broadcast signal,
an operation of outputting the advertisement contents through an entire area of the display,
an operation of receiving the broadcast signal including broadcast contents through at least one of the network interface device and the broadcast reception device,
an operation of calculating a buffering time corresponding to a time delay based on at least one of a reception delay of the broadcast signal, a processing delay of the broadcast signal, a reception delay of the personal advertisement signal or a processing delay of the personal advertisement signal,
an operation of calculating an end time of the advertisement contents by adding the buffering time and a total time of the advertisement contents to a start time of the advertisement contents,
an operation of determining whether a start time of the broadcast contents precedes the end time of the advertisement contents, and a simultaneous output operation of outputting the broadcast contents through a first area of the entire area of the display from the start time of the broadcast contents, and outputting the advertisement contents through a second area of the entire area of the display, when the start time of the broadcast contents precedes the end time of the advertisement contents.

6. The method of claim 5, further comprising an operation of outputting the broadcast contents through the entire area of the display, when the output of the advertisement contents is terminated at the end time of the advertisement contents.

7. The method of claim 6, wherein the operation of determining whether a start time of the broadcast contents precedes the end time of the advertisement contents comprises:
   an operation of receiving a synchronization signal including information related to the start time and an end time of the broadcast contents, through at least one of the network interface device and the broadcast reception device; and
   an operation of determining whether the start time of the broadcast contents precedes a start time of the advertisement contents and the end time of the advertisement contents, based on the synchronization signal.

8. The method of claim 5, wherein the simultaneous output operation comprises an operation of outputting information related to a time remaining until the end time of the advertisement contents through the display, from the start time of the broadcast contents to the end time of the advertisement contents.

* * * * *